US012466379B2

(12) United States Patent
Lee et al.

(10) Patent No.: US 12,466,379 B2
(45) Date of Patent: Nov. 11, 2025

(54) INTEGRATED ELECTRONIC BRAKE APPARATUS AND CONTROL METHOD THEREOF

(71) Applicant: HYUNDAI MOBIS Co., Ltd., Seoul (KR)

(72) Inventors: Ju Ho Lee, Yongin-si (KR); Jae Hyun Park, Yongin-si (KR); In Soo Jeon, Yongin-si (KR); Byeong Jin Choi, Yongin-si (KR); Bo Min Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 815 days.

(21) Appl. No.: 17/689,556

(22) Filed: Mar. 8, 2022

(65) Prior Publication Data

US 2022/0289162 A1 Sep. 15, 2022

(30) Foreign Application Priority Data

Mar. 12, 2021 (KR) .................. 10-2021-0032931

(51) Int. Cl.
*B60T 13/74* (2006.01)
*B60T 8/17* (2006.01)
(Continued)

(52) U.S. Cl.
CPC .............. *B60T 13/746* (2013.01); *B60T 8/17* (2013.01); *B60T 13/686* (2013.01); *F16D 65/16* (2013.01);
(Continued)

(58) Field of Classification Search
CPC ........ B60T 8/368; B60T 13/74; B60T 13/746; B60T 13/686; B60T 2270/413
See application file for complete search history.

(56) References Cited

U.S. PATENT DOCUMENTS

2006/0162986 A1* 7/2006 Disser ............... H04L 12/40182
180/402
2013/0282249 A1* 10/2013 Heise .................... B60T 13/746
701/70
(Continued)

FOREIGN PATENT DOCUMENTS

CN         2051312235 U     4/2016
KR         10-1417863 B1    7/2014
(Continued)

*Primary Examiner* — Bradley T King
(74) *Attorney, Agent, or Firm* — Morgan, Lewis & Bockius LLP (57) ABSTRACT

An integrated electronic brake apparatus may include: a main control unit configured to receive one or more of an EPB signal, a value from a pedal sensor, a value from a cylinder pressure sensor, or a value from a wheel speed sensor, perform EPB control, drive a main brake valve and a brake motor for main braking of the vehicle according to an operation of a pedal, and drive an additional brake valve for additional braking; an auxiliary control unit configured to receive one or more of the EPB signal, the value from the pedal sensor, or the value from the wheel speed sensor when a driving signal is inputted thereto, perform EPB control, and control the operation of the EPB to perform a pseudo ABS operation; and a connection bus configured to connect the first and second areas mounted in one box, and transfer a signal transmitted/received between the main control unit and the auxiliary control unit.

16 Claims, 3 Drawing Sheets

(51) Int. Cl.
  *B60T 13/68* (2006.01)
  *F16D 65/16* (2006.01)
  *F16D 121/24* (2012.01)

(52) U.S. Cl.
  CPC ..... *B60T 2270/413* (2013.01); *B60Y 2400/81* (2013.01); *F16D 2121/24* (2013.01)

(56) References Cited

U.S. PATENT DOCUMENTS

| | | | | |
|---|---|---|---|---|
| 2014/0129108 A1* | 5/2014 | Grieser-Schmitz | ... | B60T 13/662 701/70 |
| 2017/0341636 A1* | 11/2017 | Henson | ... | B60T 8/885 |
| 2019/0054909 A1* | 2/2019 | Shah | ... | B60T 8/00 |
| 2020/0023823 A1* | 1/2020 | Baehrle-Miller | ... | B60T 8/321 |
| 2020/0023825 A1* | 1/2020 | Mitchell | ... | B60T 13/746 |
| 2020/0079335 A1* | 3/2020 | Linhoff | ... | B60T 8/321 |
| 2020/0114889 A1* | 4/2020 | Egnor | ... | B60T 11/20 |
| 2020/0369253 A1* | 11/2020 | Shah | ... | B60T 13/662 |
| 2021/0129817 A1* | 5/2021 | Michels | ... | B60T 8/1755 |
| 2021/0179051 A1* | 6/2021 | Alford | ... | B60T 13/745 |
| 2021/0347370 A1* | 11/2021 | Nemeth | ... | B60T 8/885 |
| 2021/0354672 A1* | 11/2021 | Qiang | ... | B60T 8/885 |
| 2021/0370899 A1* | 12/2021 | Hwang | ... | B60L 7/26 |
| 2022/0017059 A1* | 1/2022 | Kistner | ... | B60T 17/221 |
| 2022/0073038 A1* | 3/2022 | Suzuki | ... | F16D 65/18 |
| 2022/0144224 A1* | 5/2022 | Tarandek | ... | G05G 5/03 |
| 2022/0169222 A1* | 6/2022 | Ullrich | ... | B60Q 9/00 |
| 2022/0194339 A1* | 6/2022 | Tarandek | ... | B60T 13/145 |
| 2022/0194344 A1* | 6/2022 | Tarandek | ... | B60T 8/17 |
| 2022/0227340 A1* | 7/2022 | Kim | ... | H02P 25/22 |
| 2022/0289156 A1* | 9/2022 | Lee | ... | B60T 8/329 |
| 2022/0340113 A1* | 10/2022 | Kim | ... | H02K 11/33 |
| 2023/0174036 A1* | 6/2023 | Saotome | ... | B60T 8/17616 701/78 |
| 2023/0339447 A1* | 10/2023 | Ha | ... | B60T 13/745 |

FOREIGN PATENT DOCUMENTS

| KR | 10-2015-0043736 A | 4/2015 |
|---|---|---|
| KR | 10-2020-0140752 A | 12/2020 |

* cited by examiner

INTEGRATED ELECTRONIC BRAKE APPARATUS AND CONTROL METHOD THEREOF

CROSS-REFERENCE TO RELATED APPLICATION

This application claims priority from and the benefit of Korean Patent Application No. 10-2021-0032931, filed on Mar. 12, 2021, which is hereby incorporated by reference for all purposes as if set forth herein.

BACKGROUND

Field

Exemplary embodiments of the present disclosure relate to n integrated electronic brake apparatus and a control method thereof, and more particularly, to an integrated electronic brake apparatus, which includes a main control unit and an auxiliary control unit, serving as a control module thereof, located in two independent areas, respectively, and configured in one box through an internal connection bus, and can perform a pseudo ABS (Anti-lock Brake System) function based on an EPB (Electronic Parking Brake) through the auxiliary control unit when the main control unit fails, and a control method thereof.

Discussion of the Background

A vehicle absolutely needs a brake system. That is because an unstoppable vehicle cannot run. Therefore, for a passenger's safety, the stability of the brake system cannot be overemphasized.

Therefore, the brake system boosts and provides brake hydraulic pressure by using an electronic master booster instead of a conventional hydraulic system. The vehicle employs an ABS (Anti-lock Brake System), an ESC (Electronic Stability Control) system, and an EPB (Electronic Parking Brake). The ABS serves to prevent a tire lock in case of emergency braking, and help a driver to avoid rapidly operating a steering wheel for avoidance of risk, thereby shortening a braking distance. The ESC system serves to adjust the brake force and engine output of the vehicle in a dangerous situation where the vehicle is skidding, thereby stably maintaining the posture of the vehicle. The EPB is automatically operated so that the vehicle is not pushed to the rear when stopped and starting on a hill, and automatically released when the vehicle starts.

Recently, with much attention paid to an autonomous vehicle or electric vehicle, the brake system also requires a stronger brake force and better stability. Thus, such electronic control brake apparatuses are combined and applied.

The related art of the present disclosure is disclosed in Korean Patent No. 10-1417863 published on Jul. 9, 2014 and entitled "Electronic Control Brake System".

In order to implement a braking operation by combining the electronic control brake apparatuses, a number of wiring lines are required to operate the apparatuses.

Furthermore, since mounting positions are required to mount the electronic control brake apparatuses, a space for mounting the apparatuses needs to be secured in the vehicle.

When an electronic control brake apparatus does not operate due to a failure which occurs during driving of the vehicle, a big accident may be followed. Therefore, there is a need for provision for an inoperable status of an electronic control brake apparatus.

SUMMARY

Various embodiments are directed to an integrated electronic brake apparatus, which includes a main control unit and an auxiliary control unit, serving as a control module thereof, located in two independent areas, respectively, and configured in one box through an internal connection bus, and can perform a pseudo ABS (Anti-lock Brake System) function based on an EPB (Electronic Parking Brake) through the auxiliary control unit when the main control unit fails, and a control method thereof.

In an embodiment, an integrated electronic brake apparatus may include: a main control unit mounted in a first area, and configured to receive one or more of an EPB (Electronic Parking Brake) signal, a value from a pedal sensor, a value from a cylinder pressure sensor, or a value from a wheel speed sensor, perform EPB control, drive a main brake valve and a brake motor for main braking of the vehicle according to an operation of a pedal, and drive an additional brake valve for additional braking; an auxiliary control unit mounted in a second area, and configured to receive one or more of the EPB signal, the value from the pedal sensor, or the value from the wheel speed sensor when a driving signal is inputted thereto, perform EPB control, and control the operation of the EPB to perform a pseudo ABS (Anti-lock Brake System) operation in connection with a peripheral control apparatus; and a connection bus configured to connect the first and second areas mounted in one box, and transfer a signal transmitted/received between the main control unit and the auxiliary control unit.

The driving signal may include one or more of a watch dog signal or a user selection signal.

The integrated electronic brake apparatus may further include: a first connector mounted in the first area, and configured to connect the main control unit and a peripheral apparatus; and a second connector mounted in the second area and configured to connect the auxiliary control unit and a peripheral apparatus.

The main control unit and the auxiliary control unit may determine the validity of a pedal signal inputted from the main control unit and the validity of a pedal signal inputted from the auxiliary control unit, respectively.

The main control unit may include: a first pedal signal input unit configured to receive a pedal stroke value from the pedal sensor; a cylinder pressure input unit configured to receive a cylinder pressure value from the cylinder pressure sensor; a first wheel speed input unit configured to receive a wheel speed value from the wheel speed sensor and decode the received value; a first EPB signal input unit configured to receive an EPB signal; a first EPB driving unit configured to operate a parking brake; a main brake valve driving unit configured to drive the main brake valve for main braking of the vehicle; an additional brake valve driving unit configured to drive the additional brake valve for additional braking; a motor driving unit configured to drive the brake motor; a watch dog signal generation unit configured to generate a watch dog signal; and a first micro control unit (MCU) configured to control the main brake valve driving unit, the additional brake valve driving unit, the motor driving unit and the first EPB driving unit according to signals inputted from one or more of the first pedal signal input unit, the cylinder pressure input unit, the first wheel speed input unit, or the first EPB signal input unit.

The additional brake valve may include an inlet valve and outlet valve for controlling fluid pressure supplied to a wheel cylinder, for the ABS and ESC (Electronic Stability Control) function.

The main control unit may further include a first communication unit configured to communicate with a peripheral control apparatus through communication with the vehicle.

The main control unit may further include a first brake light switch configured to operate a brake light.

The auxiliary control unit may include: a second pedal signal input unit configured to receive a pedal stroke value from the pedal sensor; a second wheel speed input unit configured to receive a wheel speed value from the wheel speed sensor and decode the received value; a watch dog signal detection unit configured to detect a watch dog signal; a second EPB signal input unit configured to receive an EPB signal; a second EPB driving unit configured to operate a parking brake; a second communication unit configured to communicate with a peripheral control apparatus within the vehicle; and a second MCU configured to perform EPB control and control the second EPB driving unit to perform a pseudo ABS operation in connection with the peripheral control apparatus according to signals inputted from one or more of the second pedal signal input unit, the second wheel speed input unit and, or second EPB signal input unit, when the driving signal is inputted thereto.

The auxiliary control unit may further include a second brake light switch configured to operate a brake light.

The second MCU may have a lower performance specification than the first MCU of the main control unit.

In an embodiment, a control method of an integrated electronic brake apparatus may include: monitoring, by a micro control unit (MCU), whether a driving signal for driving an auxiliary control unit is inputted; receiving, by the MCU, one or more of a pedal stroke value from a pedal signal input unit of the auxiliary control unit, a wheel speed value from a wheel speed input unit of the auxiliary control unit, or an EPB signal from an EPB signal input unit of the auxiliary control unit, when it is monitored that the driving signal is inputted; receiving, by the MCU, the status of the vehicle in connection with a peripheral control apparatus within the vehicle through a communication unit of the auxiliary control unit; and performing, by the MCU, EPB control according to the EPB signal, and controlling an EPB driving unit of the auxiliary control unit to perform a pseudo ABS operation in connection with the peripheral control apparatus based on the pedal stroke value and the wheel speed value.

The driving signal may include one or more of a watch dog signal or a user selection signal.

The control method may further include determining, by the MCU, the validity of a pedal signal inputted from the pedal signal input unit of the auxiliary control unit and the validity of a pedal signal inputted from a pedal signal input unit of a main control unit.

The controlling an EPB driving unit may include operating, by the MCU, a brake light switch according to the pedal stroke value.

In the integrated electronic brake apparatus and the control method thereof in accordance with the embodiments of the present disclosure, the control module of the integrated electronic brake apparatus may be configured as the main control unit and the auxiliary control unit, which are located in two independent areas and connected to each other in one box through the internal connection bus. When the main control unit fails, the integrated electric brake apparatus may perform the pseudo ABS function based on the EPB through the auxiliary control unit. Thus, when a small autonomous vehicle is implemented, the electronic brake apparatus may be reduced in size and weight, and the stability of the vehicle may be improved.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an integrated electronic brake apparatus and a control method thereof will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
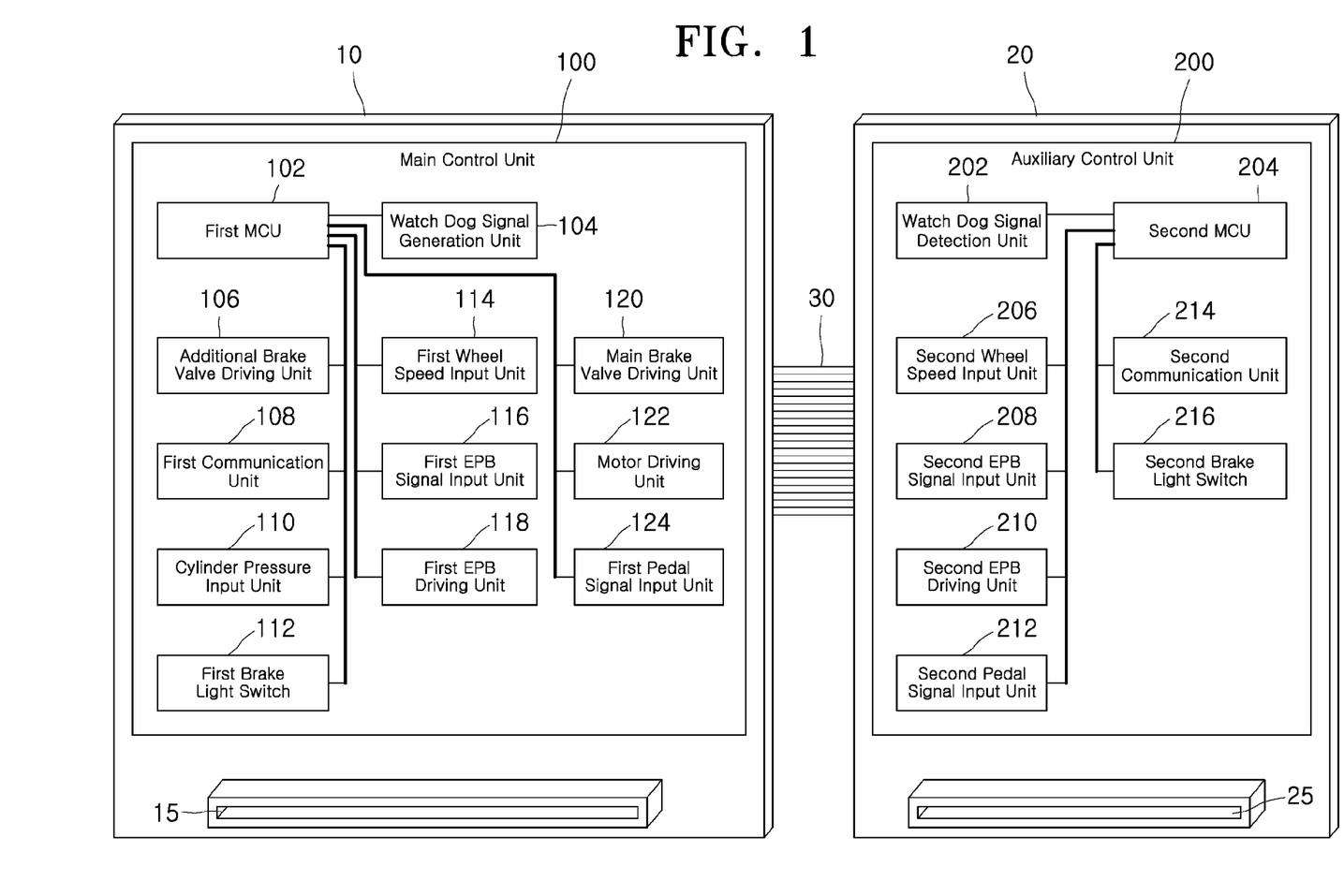
FIG. 1 is a block configuration diagram illustrating an integrated electronic brake apparatus in accordance with an embodiment of the present disclosure.
Figure 2:
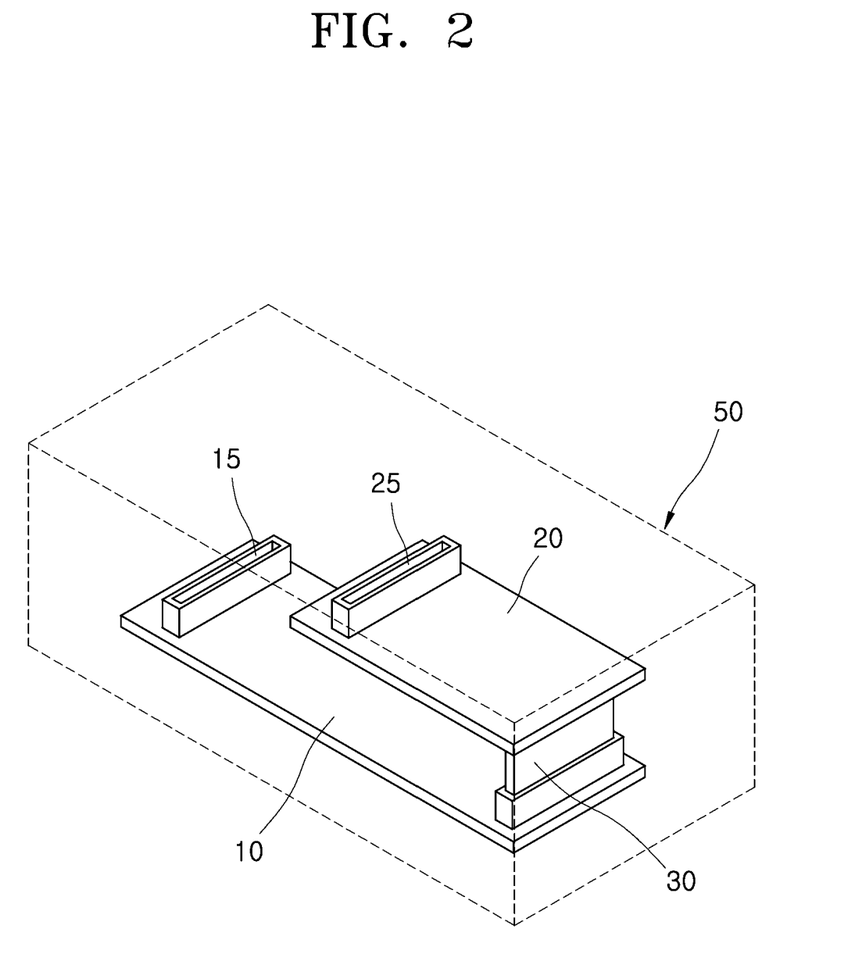
FIG. 2 is a diagram illustrating a control module structure of the integrated electronic brake apparatus in accordance with the embodiment of the present disclosure.

FIG. 1 is a block configuration diagram illustrating an integrated electronic brake apparatus in accordance with an embodiment of the present disclosure, and FIG. 2 is a diagram illustrating a control module structure of the integrated electronic brake apparatus in accordance with the embodiment of the present disclosure.

As illustrated in FIGS. 1 and 2, the integrated electronic brake apparatus in accordance with the embodiment of the present disclosure may include a main control unit 100, an auxiliary control unit 200 and a connection bus 30.

The main control unit 100 may be located in a first area 10, and configured to receive one or more of an EPB signal, a value from a pedal sensor, a value from a cylinder pressure sensor, or a value from a wheel speed sensor, perform EPB control, drive a main brake valve and a brake motor for main braking of the vehicle according to an operation of a pedal, drive an additional brake valve for additional braking, and generate a watch dog signal.

The auxiliary control unit 200 may be located in a second area 20, and configured to receive one or more of the EPB signal, the value from the pedal sensor, or the value from the wheel speed sensor, when a driving signal is inputted thereto, perform EPB control, and control the operation of the EPB to perform a pseudo ABS operation in connection with a peripheral control apparatus.

The connection bus 30 may connect the first and second areas 10 and 20 mounted in one box 50, and transfer a signal transmitted/received between the main control unit 100 and the auxiliary control unit 200 through GPIO (General Purpose Input Output) or UART (Universal Asynchronous Receiver Transmitter).

As illustrated in FIG. 2, the connection bus 30 may be configured as a connector to connect the first and second areas 10 and 20 which are disposed as a plurality of layers on independent PCBs. Alternatively, the first and second areas 10 and 20 may be disposed on a single-layer PCB so as to be distinguished from each other, and then connected to each other through a pattern.

That is, as illustrated in FIG. 2, the control module of the integrated electronic brake apparatus in accordance with the present embodiment may be configured so that the first area 10 having the main control unit 100 mounted thereon and the second area 20 having the auxiliary control unit 200 mounted thereon are connected to each other in the box 50 through the connection bus 30, and connected to a peripheral apparatus through a wire harness connected to first and second connectors 15 and 25.

Furthermore, when the main control unit 100 and the auxiliary control unit 200 are configured on a single PCB such that the first and second areas 10 and 20 are distinguished from each other, the main control unit 100 and the auxiliary control unit 200 may be connected to a peripheral apparatus through any one connector of the first and second connectors 15 and 25, and separately supply data and power through the connection bus 30.

The main control unit 100 and the auxiliary control unit 200 may determine the validity of the pedal signal inputted from the main control unit 100 and the validity of the pedal signal inputted from the auxiliary control unit 200, respectively.

That is, the main control unit 100 and the auxiliary control unit 200 may receive a pedal stroke value of the pedal sensor by a first channel output and a pedal stroke value of the pedal sensor by a second channel output, and determine the validity of the pedal signal.

At this time, the main control unit 100 and the auxiliary control unit 200 may receive the pedal stroke value of the pedal sensor by the first channel output and the pedal stroke value of the pedal sensor by the second channel output, respectively. Alternatively, the main control unit 100 and the auxiliary control unit 200 may both receive the pedal stroke value of the pedal sensor by the first channel output and the pedal stroke value of the pedal sensor by the second channel output.

In the present embodiment, the case in which the main control unit 100 receives the pedal stroke value by the first channel output and the auxiliary control unit 200 receives the pedal stroke value by the second channel output will be taken as an example for description.

More specifically, the main control unit 100 may include a first pedal signal input unit 124, a cylinder pressure input unit 110, a first wheel speed input unit 114, a first EPB signal input unit 116, a first EPB driving unit 118, a main brake valve driving unit 120, an additional brake valve driving unit 106, a motor driving unit 122, a watch dog signal generation unit 104, a first MCU 102, a first communication unit 108 and a first brake light switch 112.

The first pedal signal input unit 124 may receive the pedal stroke value of the pedal sensor by the first channel output, and transfer the received value to the first MCU 102. Therefore, the first MCU 102 may determine how a driver operates the brake, on the basis of the pedal stroke value, and perform brake control.

The cylinder pressure input unit 110 may receive a master cylinder pressure value and a backup cylinder pressure value from the cylinder pressure sensor, and transfer the received values to the first MCU 102.

The first wheel speed input unit 114 may receive a wheel speed value from the wheel speed sensor, decode the received value through an ASIC chip, and transfer the decoded value to the first MCU 102. Thus, the first wheel speed input unit 114 may receive the speed of each wheel as well as the speed of the vehicle.

The first EPB signal input unit 116 may receive the EPB signal for operating a parking brake, and transfer the received signal to the first MCU 102.

The first EPB driving unit 118 may operate the parking brake.

The main brake valve driving unit 120 may drive the main brake valve for adjusting the fluid pressure of a master cylinder, in order to perform main braking of the vehicle according to the operation of the pedal.

The additional brake valve driving unit 106 may drive the additional brake valve including inlet and outlet valves for controlling the fluid pressure supplied to the wheel cylinder, in order to perform additional braking according to the ABS or ESC function.

The motor driving unit 122 may drive the brake motor for main braking of the vehicle.

The watch dog signal generation unit 104 counts whether a failure occurs, while communicating with the first MCU 102. When a failure occurred, the watch dog signal generation unit 104 generates a watch dog signal.

The first MCU 102 may control the main brake valve driving unit 120, the additional brake valve driving unit 106, the motor driving unit 122 and the first EPB driving unit 118 according to the pedal stroke value, the pressure value, the wheel speed value and the EPB signal, which are inputted from one or more of the first pedal signal input unit 124, the cylinder pressure input unit 110, the first wheel speed input unit 114, or the first EPB signal input unit 116.

The first communication unit 108 may communicate with a control apparatus within the vehicle through P-CAN or C-CAN. Therefore, the first MCU 102 may perform brake control through cooperation control in connection with the control apparatus within the vehicle.

The first brake light switch 112 may operate a brake light according to the pedal stroke value from the first MCU 102.

Furthermore, the auxiliary control unit 200 may include a second pedal signal input unit 212, a second wheel speed input unit 206, a bypass circuit unit 206, a watch dog signal detection unit 202, a second EPB signal input unit 208, a second EPB driving unit 210, a second communication unit 214, a second brake light switch 216 and a second MCU 204.

The second pedal signal input unit 212 may receive the pedal stroke value of the pedal sensor by the second channel output, and transfer the received value to the second MCU 204. Therefore, the second MCU 204 may determine how the driver operates the brake, on the basis of the pedal stroke value, and perform brake control.

The second wheel speed input unit 206 may receive a wheel speed value from the wheel speed sensor, decode the received value through the ASIC chip, and transfer the decoded value to the second MCU 204. Thus, the second wheel speed input unit 206 may receive the speed of each wheel as well as the speed of the vehicle.

The watch dog signal detection unit 202 may detect a watch dog signal, and transfer the detected watch dog signal to the second MCU 204 to determine whether the first MCU 102 fails.

The second EPB signal input unit 208 may receive the EPB signal for operating the parking brake, and transfer the received signal to the second MCU 204.

The second EPB driving unit 210 may operate the parking brake.

The second communication unit 214 may communicate with a control apparatus within the vehicle through P-CAN or C-CAN. Therefore, the second MCU 204 may perform brake control through cooperation control in connection with the control apparatus within the vehicle.

When at least any one of the watch dog signal and a user selection signal is inputted as a driving signal for driving the auxiliary control unit 200, the second MCU 204 may receive the pedal stroke value, the wheel speed value and the EPB signal, which are inputted from one or more of the second pedal signal input unit 212, the second wheel speed input unit 206, or the second EPB signal input unit 208, perform the EPB control, and control the second EPB driving unit 210 to perform a pseudo ABS operation in connection with the peripheral control apparatus through the EPB control and the second communication unit 214.

That is, the second MCU 204 may perform a pseudo ABS operation based on the EPB, in order to cope with an emergency situation.

Furthermore, the second MCU 204 may receive the EPB signal from the second EPB signal input unit 208, and control the second EPB driving unit 210 to operate the parking brake.

The second brake light switch 216 may operate the brake light according to the pedal stroke value from the second MCU 204.

Since the first MCU 102 performs the main brake control and the additional brake control and the second MCU 204 performs only the EPB driving control, the second MCU 204 may have a lower performance specification than the first MCU 102.

In the above-described integrated electronic brake apparatus in accordance with the embodiment of the present disclosure, the control module of the integrated electronic brake apparatus may be configured as the main control unit and the auxiliary control unit, which are located in two independent areas and connected to each other in one box through the internal connection bus. When the main control unit fails, the integrated electric brake apparatus may perform the pseudo ABS function based on the EPB through the auxiliary control unit. Thus, when a small autonomous vehicle is implemented, the electronic brake apparatus may be reduced in size and weight, and the stability of the vehicle may be improved.

Figure 3:
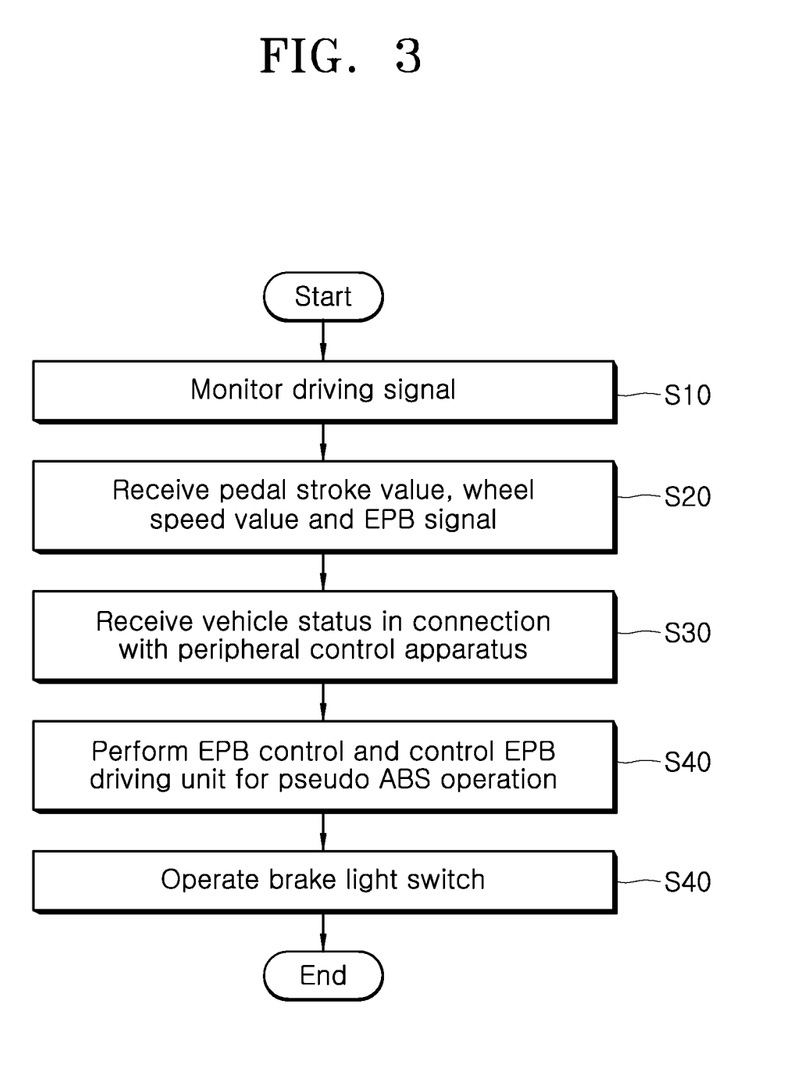
FIG. 3 is a flowchart for describing a control method of an integrated electronic brake apparatus in accordance with an embodiment of the present disclosure.

FIG. 3 is a flowchart for describing a control method of an integrated electronic brake apparatus in accordance with an embodiment of the present disclosure.

As illustrated in FIG. 3, the control method of the integrated electronic brake apparatus in accordance with the embodiment of the present disclosure may include a process in which the main control unit 100 receives one or more of the EPB signal, the value from the pedal sensor, the value from the cylinder pressure sensor, or the value from the wheel speed sensor, drives the main brake valve and the brake motor for main braking of the vehicle according to an operation of the pedal, performs EPB control, drives the additional brake valve for additional braking, and generates a watch dog signal.

Since the control method of the integrated electronic brake apparatus by the main control unit 100 is a typical control method, the detailed descriptions thereof will be omitted herein. In the present embodiment, a control method of the integrated electronic brake apparatus by the auxiliary control unit 200 will be described.

When a failure occurs in the first MCU 102 while the integrated electronic brake apparatus is controlled by a normal operation of the main control unit 100, the watch dog signal is generated.

That is, the second MCU 204 monitors whether the watch dog signal is generated by the main control unit 100 or a user selection signal is inputted by a user, as a driving signal for driving the auxiliary control unit 200, through the watch dog signal detection unit 202.

When it is monitored in step S10 that the driving signal is inputted, the second MCU 204 receives a pedal stroke value, a wheel speed value, and an EPB signal from one or more of the second pedal signal input unit 212, the second wheel speed input unit 206, or the second EPB signal input unit 208, in step S20.

The second MCU 204 may determine the validity of the pedal signal inputted from the second pedal signal input unit 212 and the validity of the pedal signal inputted from the first pedal signal input unit 124 of the main control unit 100.

After receiving the pedal stroke value and the wheel speed value in step S20, the second MCU 204 may receive the status of the vehicle for an ABS operation in connection with a peripheral control apparatus within the vehicle through the second communication unit 214 in step S30.

According to the EPB signal inputted in step S20, the second MCU 204 not only performs EPB control by controlling the second EPB driving unit 210, but also controls the second EPB driving unit 210 to perform a pseudo ABS operation according to the vehicle status inputted in connection with the peripheral control apparatus in step S30 on the basis of the pedal stroke value and the wheel speed value, in step S40.

According to the pedal stroke value in step S40, the second MCU 204 operates the second brake light switch 216 to turn on the brake light in step S50.

In the above-described control method of the integrated electronic brake apparatus in accordance with the embodiment of the present disclosure, the control module of the integrated electronic brake apparatus may be configured as the main control unit and the auxiliary control unit, which are located in two independent areas and connected to each other in one box through the internal connection bus. When the main control unit fails, the integrated electric brake apparatus may perform the pseudo ABS function based on the EPB through the auxiliary control unit. Thus, when a small autonomous vehicle is implemented, the electronic brake apparatus may be reduced in size and weight, and the stability of the vehicle may be improved.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An integrated electronic brake apparatus comprising:
   a main control unit mounted in a first area, and configured to receive one or more of an EPB (Electronic Parking Brake) signal, a value from a pedal sensor, a value from a cylinder pressure sensor, or a value from a wheel speed sensor, to perform EPB control, to drive a main brake valve and a brake motor for main braking of a vehicle according to an operation of a pedal, and to drive an additional brake valve for additional braking;
   an auxiliary control unit mounted in a second area, and configured to receive one or more of the EPB signal, the value from the pedal sensor, or the value from the wheel speed sensor when a driving signal is inputted thereto, to perform EPB control, and to control an operation of an EPB to perform a pseudo ABS (Anti-lock Brake System) operation in connection with a peripheral control apparatus; and
   a connection bus configured to connect the first and second areas mounted in one box to each other, and to transfer a signal transmitted/received between the main control unit and the auxiliary control unit,
   wherein the main control unit comprises:
      a first EPB driving unit configured to operate a parking brake;
      a main brake valve driving unit configured to drive the main brake valve for the main braking of the vehicle;
      an additional brake valve driving unit configured to drive the additional brake valve for the additional braking;
      a motor driving unit configured to drive the brake motor; and
      a first micro control unit (MCU) configured to control the main brake valve driving unit, the additional brake valve driving unit, the motor driving unit and the first EPB driving unit,
   wherein the auxiliary control unit comprises:
      a second EPB driving unit configured to operate a parking brake;
      a second MCU configured to perform EPB control and control the second EPB driving unit to perform a pseudo ABS operation in connection with the peripheral control apparatus,
   wherein the second MCU has a lower performance specification than the first MCU of the main control unit such that the first MCU performs the main braking and the additional braking while the second MCU performing the EPB control and not performing the main braking and the additional braking.

2. The integrated electronic brake apparatus of claim 1, wherein the driving signal comprises one or more of a watch dog signal or a user selection signal.

3. The integrated electronic brake apparatus of claim 1, further comprising:
   a first connector mounted in the first area, and configured to connect the main control unit to the peripheral control apparatus; and
   a second connector mounted in the second area and configured to connect the auxiliary control unit to the peripheral control apparatus.

4. The integrated electronic brake apparatus of claim 1, wherein the main control unit and the auxiliary control unit are further configured to determine a validity of a pedal signal inputted from the main control unit and a validity of a pedal signal inputted from the auxiliary control unit, respectively.

5. The integrated electronic brake apparatus of claim 1, wherein the main control unit further comprises:
   a first pedal signal input unit configured to receive a pedal stroke value from the pedal sensor;
   a cylinder pressure input unit configured to receive a cylinder pressure value from the cylinder pressure sensor;
   a first wheel speed input unit configured to receive a wheel speed value from the wheel speed sensor and to decode the received wheel speed value;
   a first EPB signal input unit configured to receive an EPB signal; and
   a watch dog signal generation unit configured to generate a watch dog signal,
   the first MCU controls the main brake valve driving unit, the additional brake valve driving unit, the motor driving unit and the first EPB driving unit according to signals inputted from one or more of the first pedal signal input unit, the cylinder pressure input unit, the first wheel speed input unit, or the first EPB signal input unit.

6. The integrated electronic brake apparatus of claim 5, wherein the additional brake valve comprises an inlet valve and outlet valve for controlling fluid pressure supplied to a wheel cylinder, for an ABS and ESC (Electronic Stability Control) function.

7. The integrated electronic brake apparatus of claim 5, wherein the main control unit further comprises a first communication unit configured to communicate with the peripheral control apparatus through communication with the vehicle.

8. The integrated electronic brake apparatus of claim 5, wherein the main control unit further comprises a first brake light switch configured to operate a brake light.

9. The integrated electronic brake apparatus of claim 1, wherein the auxiliary control unit further comprises:
   a second pedal signal input unit configured to receive a pedal stroke value from the pedal sensor;
   a second wheel speed input unit configured to receive a wheel speed value from the wheel speed sensor and to decode the received wheel speed value;
   a watch dog signal detection unit configured to detect a watch dog signal;

a second EPB signal input unit configured to receive an EPB signal;

a second communication unit configured to communicate with the peripheral control apparatus within the vehicle, the second MCU performs the EPB control and control the second EPB driving unit to perform a pseudo ABS operation in connection with the peripheral control apparatus according to signals inputted from one or more of the second pedal signal input unit, the second wheel speed input unit, or the second EPB signal input unit, when the driving signal is inputted thereto.

10. The integrated electronic brake apparatus of claim 9, wherein the auxiliary control unit further comprises a second brake light switch configured to operate a brake light.

11. The integrated electronic brake apparatus of claim 1, wherein the main and auxiliary control units are disposed as a plurality of layers on independent PCBs that at least partially overlap each other in the one box.

12. A control method of an integrated electronic brake apparatus including a main control unit mounted in a first area, an auxiliary control unit mounted in a second area, and a connection bus configured to connect the first and second areas mounted in one box to each other and to transfer a signal transmitted/received between the main control unit and the auxiliary control unit, comprising:

monitoring, by a micro control unit (MCU), whether a driving signal for driving the auxiliary control unit is inputted;

receiving, by the MCU, one or more of a pedal stroke value from a pedal signal input unit of the auxiliary control unit, a wheel speed value from a wheel speed input unit of the auxiliary control unit, or an EPB (Electronic Parking Brake) signal from an EPB signal input unit of the auxiliary control unit, when the driving signal is determined to be inputted;

receiving, by the MCU, a status of a vehicle in connection with a peripheral control apparatus within the vehicle through a communication unit of the auxiliary control unit; and performing, by the MCU, EPB control according to the EPB signal, and controlling an EPB driving unit of the auxiliary control unit to perform a pseudo ABS (Antilock Brake System) operation in connection with the peripheral control apparatus based on the pedal stroke value and the wheel speed value, wherein the main control unit comprises:
a first EPB driving unit configured to operate a parking brake;
a main brake valve driving unit configured to drive a main brake valve for main braking of the vehicle;
an additional brake valve driving unit configured to drive an additional brake valve for additional braking;
a motor driving unit configured to drive a brake motor;
a first micro control unit (MCU) configured to control the main brake valve driving unit, the additional brake valve driving unit, the motor driving unit and the first EPB driving unit, wherein the auxiliary control unit comprises:
a second EPB driving unit, which is the EPB driving unit, configured to operate a parking brake; and
a second MCU, which is the MCU, configured to perform EPB control and control the second EPB driving unit to perform the pseudo ABS operation in connection with the peripheral control apparatus, wherein the second MCU has a lower performance specification than the first MCU of the main control unit such that the first MCU performs the main braking and the additional braking while the second MCU performing the EPB control and not performing the main braking and the additional braking.

13. The control method of claim 12, wherein the driving signal comprises one or more of a watch dog signal or a user selection signal.

14. The control method of claim 12, further comprising determining, by the MCU, a validity of a pedal signal inputted from the pedal signal input unit of the auxiliary control unit and a validity of a pedal signal inputted from a pedal signal input unit of the main control unit.

15. The control method of claim 12, wherein the controlling an EPB driving unit comprises operating, by the MCU, a brake light switch according to the pedal stroke value.

16. The control method of claim 12, wherein the main and auxiliary control units are disposed as a plurality of layers on independent PCBs that at least partially overlap each other in the one box.

* * * * *